United States Patent [19]

Arnold et al.

[11] 4,436,996

[45] Mar. 13, 1984

[54] BOREHOLE COMPENSATED KUT LOG

[75] Inventors: Dan M. Arnold; Harry D. Smith, Jr.; Ward E. Schultz, all of Houston, Tex.

[73] Assignee: Halliburton Company, Duncan, Okla.

[21] Appl. No.: 265,736

[22] Filed: May 21, 1981

[51] Int. Cl.³ ............................................... G01V 5/00
[52] U.S. Cl. .................................... 250/256; 250/262
[58] Field of Search ....................... 250/253, 256, 262; 73/152

[56] References Cited

U.S. PATENT DOCUMENTS

| | | | |
|---|---|---|---|
| 3,940,610 | 2/1976 | Dennis et al. | 250/262 |
| 3,976,878 | 8/1976 | Chevalier et al. | 250/253 |
| 4,187,908 | 2/1980 | Fertl et al. | 250/256 |
| 4,271,356 | 6/1981 | Groeschel et al. | 250/262 |

Primary Examiner—Janice A. Howell
Attorney, Agent, or Firm—W. J. Beard

[57] ABSTRACT

A method of logging earth formations to ascertain relative elemental abundancies of potassium (K), uranium (U) and thorium (T) is disclosed. A natural gamma ray spectrum of an unknown borehole is compared with individual standard gamma ray spectra of potassium, uranium and thorium in at least four energy ranges or bands. Decay peaks of the three elements are encompassed by three of the energy bands and at least one other energy band is used to monitor the changes in shape of the unknown spectrum caused by borehole conditions differing from that of the standard or calibration boreholes. A function derived from the gamma ray count rates in the four bands is used to compensate the elemental abundancies of the three elements to be detected in the unknown spectrum for the effects of differing borehole conditions in the unknown borehole from the standard borehole conditions.

35 Claims, 5 Drawing Figures

BOREHOLE COMPENSATED KUT LOG

BACKGROUND OF THE INVENTION

1. Field of the Invention

The present invention is concerned generally with detecting and identifying the naturally occurring radioactive elements in earth formations penetrated by a well borehole. More particularly, the invention concerns methods and apparatus for detecting and identifying elemental concentrations of potassium, uranium, and thorium in earth formations in the vicinity of the well borehole by analysis of naturally emitted gamma rays caused by radioactive decay of these substances.

2. Description of the Prior Art

In recent years gamma ray spectroscopy of earth formations in the vicinity of a well borehole has been made practical by the development by highly stable scintillation detectors which may be lowered into a well borehole and which produce a pulse height spectrum proportional to the gamma ray energy spectrum of gamma rays impinging upon the scintillation crystal. At the present time, two commercial well logging services are available for detecting the natural gamma ray spectra produced by uranium, potassium, and thorium in earth formations in the vicinity of a well borehole.

In the first of these commercially available services three energy ranges or windows centered about selected gamma ray emission peaks for naturally occurring gamma rays in the decay chain of the aforementioned elements are selected. Gamma ray count rates in each of these three energy ranges are transmitted to the surface and processed by a technique called spectrum stripping wherein standard calibration spectra for each of the individual elements (made in standard boreholes) are applied to the measurements of count rates made in the energy ranges chosen to detect each of the three elements sought to be detected. So called "stripping constants" derived from the measurement of the standard spectra in standard boreholes for each of three elements are then applied to the measured spectrum in the unknown earth formations surrounding the borehole. An estimate of the percentate of the particular three elements desired to be detected is made based on the stripping technique.

In a second, slightly more sophisticated commercially available technique, (such as that described in U.S. Pat. No. 3,976,878 to Chevalier, et al issued Aug. 24, 1976) five energy ranges or windows are utilized for the measurement of the spectrum of natural gamma rays emitted by the earth formations in the vicinity of a well borehole. The five energy range measurements used in this technique are employed in a least squares fitting scheme to determine the elemental concentrations of the three elements, again based on the spectrum of each of the individual elements of the three taken in standard boreholes. The use of the five windows gives an overdetermined set of equations (i.e. 5 equations in 3 unknowns) which are statistically enhanced by the use of the count rate data from the extra two energy windows to distinguish this technique from that described in the foregoing paragraph.

A problem which occurs in the use of either of the above referenced prior art techniques is that the measurements of the gamma ray spectra of the unknown earth formations in each instance are compared with standard spectra for each of the individual elements made in standard borehole conditions. That is to say, standard condition borehole spectra are fitted to the spectra obtained in the unknown borehole being measured in each of the above two techniques. The problem arises due to the fact that the borehole conditions in the unknown earth formations being measured may not correspond to those of the standard, or calibration, spectra boreholes. That is to say, if the standard spectra were made with a scintillation detector placed in an eight inch borehole, the effect of the borehole dimensions or casing and mud conditions on unknown spectra taken in, for example, a six or twelve inch borehole could cause variations in the spectrum stripping or fitting techniques. These variations could effect the estimates of the percentage of the three elements sought to be detected by as much as an order of magnitude. The present invention takes into account the differences in borehole sizes and borehole effects from the standard gamma ray spectra used for the comparison to the unknown spectra taken in the unknown borehole of interest.

BRIEF DESCRIPTION OF THE INVENTION

In accordance with the concepts of the present invention a scintillation type detector is utilized in an instrument lowered into an unknown borehole. The gamma ray energy spectrum detected by this scintillation detector is separated into four energy ranges or windows, three of which correspond to predominant peaks in the nuclear decay spectra of potassium, uranium, and thorium and the fourth of which is situated preferably in a lower energy range in the gamma ray spectrum emitted by the earth formations penetrated by the unknown borehole to be measured. The count rate in the fourth energy window is used to produce, in effect, a monitoring of the shape of the gamma ray spectrum caused by the differences in the borehole conditions and geometry of the unknown borehole and that of the standard borehole geometry in which calibration gamma ray spectra have been obtained. The measurement taken in the fourth energy range or window are used to provide correction factors to the stripping constants determined from the standard individual element gamma ray spectra measured in the standard boreholes. When applied to the count rate data of gamma ray spectra taken in the unknown borehole these corrections may thus correct the determination of the elemental constituency of the earth formations penetrated by such a borehole for the effects of borehole conditions and geometry.

The invention may best be understood by reference to the following detailed description thereof when taken in conjunction with the accompanying drawings in which:

DETAILED DESCRIPTION OF THE INVENTION

Logs of natural gamma ray activity in three energy ranges have been used to estimate the potassium (K), uranium (U) and thorium (Th) content of earth formations. These logs (commonly referred to K-U-T logs) were initially used in mineral exploration and bed correlation studies.

During most recent times however the K-U-T logs have been used to determine other important information about earth formations penetrated by a well borehole such as:

(1) the oxidation state of the bed at the time of deposition;

(2) quantity of organic material in sedimentary layers which (together with item 1) leads to source rock bed identification;

(3) the depositional environment of the bed (i.e. continental vs. marine deposition);

(4) water movement in downhole formations which in turn may indicate fractures, faulting or permeability;

(5) water movement in the borehole region which may indicate channeling or water producing perforations;

(6) more accurate shale content determinations for a particular bed and;

(7) clay typing and marker bed identification.

The two commercially available services at the present time each use scintillation type gamma ray detectors which are biased to record the gamma radiation in either three or five energy bands or windows. Count rate contributions from the decay of each of the elements of interest or their daughter decay products are mathematically stripped or fitted from the composite count rate observed within the three or five energy windows. Elemental concentrations may then be computed from the stripped or fitted count rates. In the second type of commercial logging operation for this purpose currently available the use of five energy windows provides an overdetermined set of relations which may be used to statistically enhance the count rate information from each of the energy windows. However, no basic change from a comparison of unknown spectra with standard gamma ray spectra taken under standard borehole conditions are contemplated in either of the commercially available techniques at present.

Changes in borehole conditions can introduce errors in concentration calculations of the elements that can approach an order of magnitude. Such errors, although large, were still tolerable in early applications of the K-U-T log for minerals exploration. However, as the applications of such logs become more sophisticated, errors of this magnitude are not acceptable.

In the present invention, a borehole compensated K-U-T log can be developed by utilizing the response of a fourth (preferably low energy) compensation energy window. The compensation window monitors the shape of the gamma ray spectrum caused by variations in borehole conditions. The response of the compensation window is then used to correct the response of the count rates in the first three energy windows to some standard borehole and formation geometry.

Figures 1, 4:
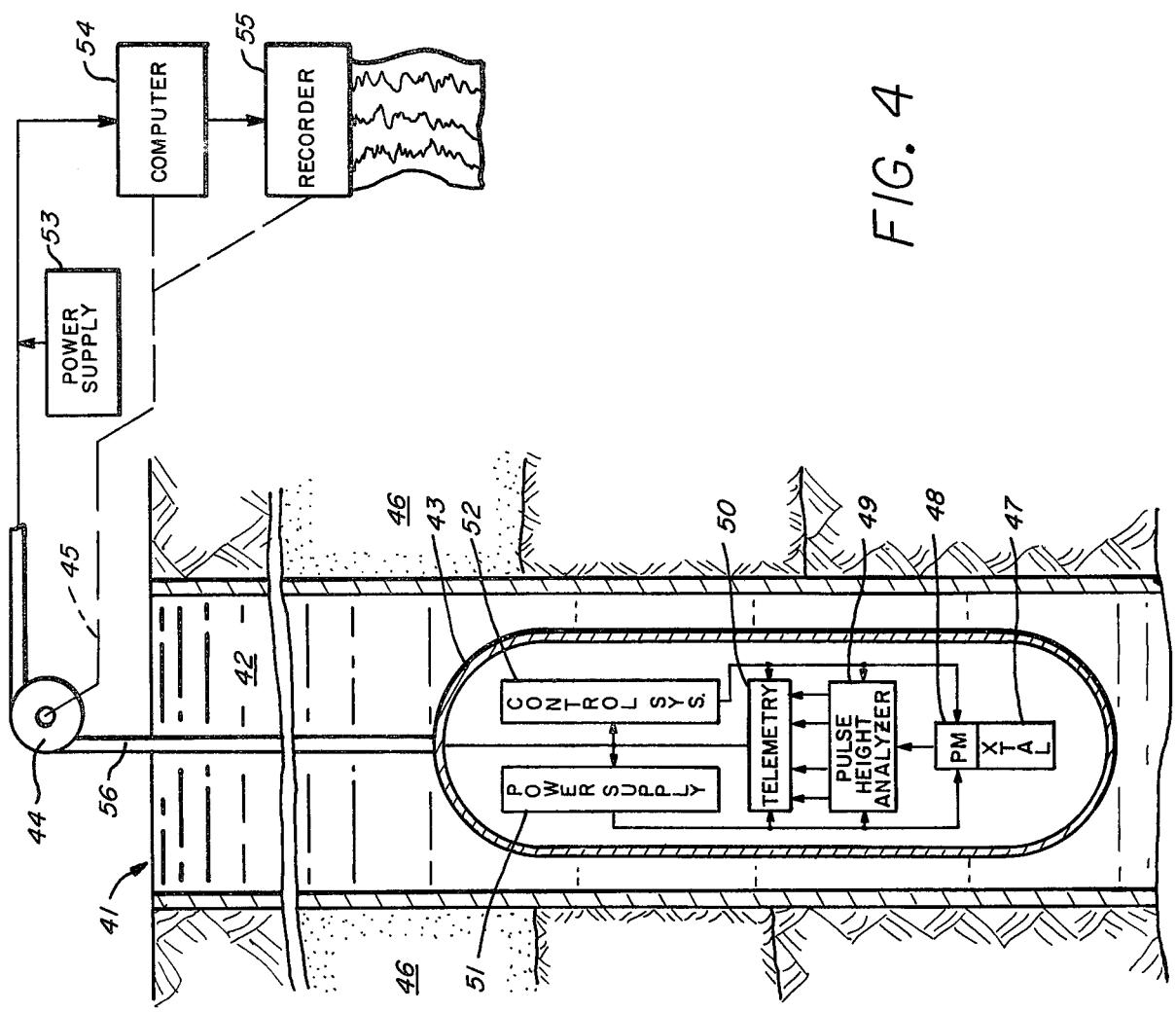
FIG. 1 is a graphical representation illustrating a typical natural gamma ray energy spectrum in a borehole taken with a scintillation detector and showing four approximate energy ranges or "windows" used in the present invention.
FIG. 4 is a schematic diagram of a well logging system employing the concepts of the present invention.

Referring now to FIG. 1, a natural gamma ray spectrum is illustrated schematically in which the gamma ray intensity or count rate is plotted as a function of gamma ray energy over the energy range from 0-3 MeV. Four energy windows contemplated for use according to the present invention are illustrated superimposed on the gamma ray spectrum of FIG. 1. The energy bands or windows labelled window 1, window 2 and window 3 are chosen to include the 2.61, 1.76 and 1.46 MeV gamma radiations from the decay of thorium (Tl$^{208}$), uranium (Bi$^{214}$), and potassium (K$^{40}$). The total count rate recorded in each window may be expressed as given in Equations 1-4.

$$C_1 = C_{1,T} \tag{1}$$

$$C_2 = C_{2,U} + K_{2,1,T} C_{1,T} \tag{2}$$

$$C_3 = C_{3,K} + K_{3,1,T} C_{1,T} + K_{3,2,U} C_{2,U} \tag{3}$$

$$C_4 = K_{4,3,K} C_{3,K} + K_{4,2,U} C_{2,U} + K_{4,1,T} C_{1,T} \tag{4}$$

where in Equations 1-4

$C_j$ = the count rate measured in window j (j=1, ..., 4)

$C_{j,k}$ = the count rate contribution in window j due only to activity from the element k (k=T,U,K)

$K_{i,j,k}$ = "stripping" constants defined as $$K_{i,j,k} = C_{i,k}/C_{j,k} \tag{5}$$

The $K_{i,j,k}$'s are measured in "standard" borehole conditions surrounded by formations, each of which contains only K, only U, or only Th. The $K_{i,j,k}$'s are, therefore, known calibration constants.

For standard borehole conditions, equations (1), (2), and (3) are solved for $C_{1,T}$, $C_{2,U}$, $C_{3,K}$ as $$C_{1,T} = C_1 \tag{6}$$

$$C_{2,U} = C_2 - (K_{2,1,T} C_{1,T}) \tag{7}$$

$$C_{3,K} = C_3 - (K_{3,1,T} C_1) - K_{3,2,U}(C_2 - K_{2,1,T} C_1) \tag{8}$$

where all terms on the right hand side of equations (6), (7), and (8) are either measured quantities ($C_1$, $C_2$, $C_3$) or known calibration constants ($K_{i,j,k}$'s). The relationship between $C_{j,k}$ and the corresponding elemental concentrations, $M_k$, will be discussed later.

In non-standard borehole conditions the stripping constants $K_{i,j,k}$ measured in "standard" borehole conditions are no longer valid. Examples of such is shown in Table I with the "nonstandard" stripping constants, calculated using Monte Carlo techniques, being denoted by primes:

Tool Diameter: 3⅝" (centralized)

Standard Borehole: 10" F.W. Filled (with 38% porosity oil sand formation).

Non-Standard Borehole: 10" B.H., 5½" F.W.CSG+CMT. (with 38% porosity oil sand formation).

TABLE 1

| Window # | Energy Range | Stripping Constants Standard $K_{i,j,k}$ | Nonstandard $K'_{i,j,k}$ |
|---|---|---|---|
| 1 | 2.0–3.0 MeV | $K_{2,1,T}$ = 0.118 | $K'_{2,1,T}$ = 0.130 |
| 2 | 1.6–2.0 MeV | $K_{3,1,T}$ = 0.157 | $K'_{3,1,T}$ = 0.235 |
| 3 | 1.1–1.6 MeV | $K_{4,1,T}$ = 0.357 | $K'_{4,1,T}$ = 0.529 |
| 4 | 0.5–1.1 MeV | $K_{3,2,U}$ = 0.406 | $K'_{3,2,U}$ = 0.388 |
| 5 | 0.15–0.5 MeV | $K_{4,2,U}$ = 0.647 | $K'_{4,2,U}$ = 0.951 |
|   |   | $K_{4,3,K}$ = 0.657 | $K'_{4,3,K}$ = 0.955 |
|   |   | $K_{5,1,T}$ = 0.864 | $K'_{5,1,T}$ = 1.029 |
|   |   | $K_{5,2,U}$ = 1.647 | $K'_{5,2,U}$ = 1.650 |
|   |   | $K_{5,3,K}$ = 1.555 | $K'_{5,3,K}$ = 1.553 |

CORRECTION OF STRIPPING CONSTANTS FOR NON-STANDARD BOREHOLE CONDITIONS USING THE RESPONSE OF THE FOURTH COUNT WINDOW C₄

There are three major parameters which affect the stripping constants as borehole and, to a lesser extent, formation conditions change. They are:

(a) $\eta \equiv \Sigma \rho_Z \chi_Z$
where $\rho_Z$ and $\chi_Z$ are the densities and effective thickness, respectively, of each intervening material Z such as borehole fluid, casing, and rock matrix between the detector within the sonde and the source of radiation.

(b) $E_k \equiv$ the primary gamma ray energy from element k (see FIG. 1)

(c) $\Delta E_{i,j} \equiv$ the difference in the midpoint of energy window j and energy window i (see FIG. 1).

Physically, the stripping constants $K_{i,j,k}$ which are measured under standard borehole conditions, must be corrected with a function of $\eta$ and $E_k$ and $\Delta E_{i,j}$ in order to obtain correct stripped count rates $C_{1,T}$ and $C_{2,U}$, and $C_{3,K}$ in non-standard boreholes. This operation can be expressed mathematically as:

$$C_{1,T} = C_1 \tag{9}$$

$$C_{2,U} = C_2 - [L(\eta)G_{2,1,T}(E_T, \Delta E_{2,1})]K_{2,1,T}C_1 \tag{10}$$

$$C_{3,K} = C_3 - [L(\eta)G_{3,1,T}(E_T, \Delta E_{3,1})]K_{3,1,T}C_1 - ([L(\eta)G_{3,2,U}(E_U, \Delta E_{3,2})]K_{3,2,U}(C_2 - [L(\eta)G_{2,1,T}(E_T, \Delta E_{2,1})]K_{2,1,T}C_1)) \tag{11}$$

Again, the terms $C_1$, $C_2$, and $C_3$ are measured and the $K_{i,j,k}$'s are known calibration constants measured under *standard* borehole conditions. Now the problem is to determine the remaining stripping function corrections terms $L(\eta)$ and $G_{i,j,k}(E_k, \Delta E_{i,j})$ where i,j, and k denote the same quantities as those used with the stripping constants $K_{i,j,k}$.

Figures 2, 2A:
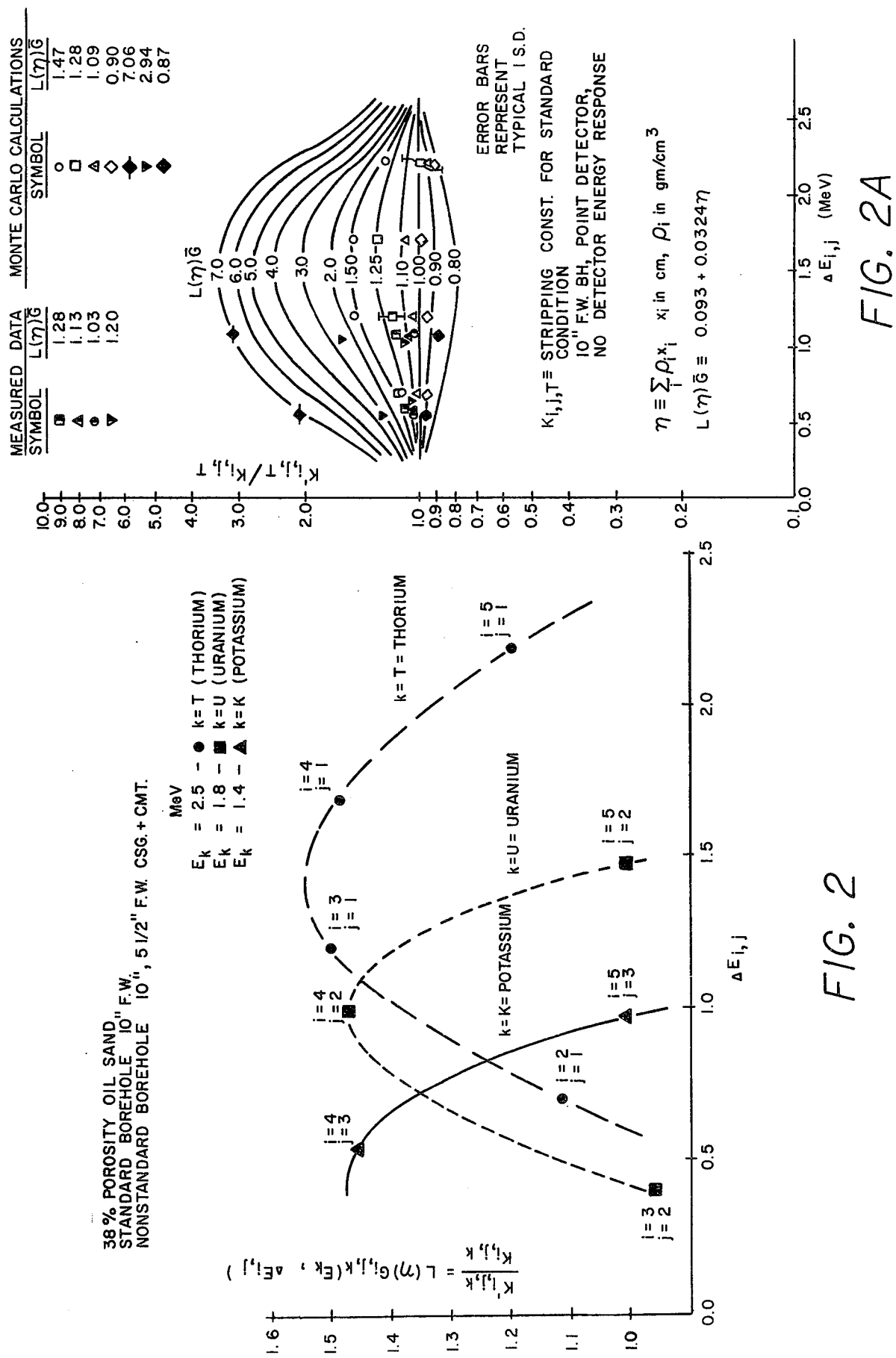
FIGS. 2 and 2a are graphical representations showing the effect on the stripping constants of borehole variations as a function of energy window placement.

Physically, the product $[L(\eta)G_{i,j,k}(E_k, \Delta E_{i,j})]K_{i,j,k}$ is simply a stripping constant for a nonstandard borehole condition, $K'_{i,j,k}$. Using the data in Table 1, the ratio $$K'_{i,j,k}/K_{i,j,k} = L(\eta)G_{i,j,k}(E_k, \Delta E_{i,j})$$

is plotted as a function of $\Delta E_{i,j}$ for k=T (thorium), k=U (uranium), and k=K (potassium) in FIG. 2.

From FIG. 2, it can be seen that the midpoint $E_k$ and widths of windows 1 through 4 were selected such that $L(\eta) G_{4,j,k}(E_k, \Delta E_{4,j})$ is essentially constant ($\approx 1.47$) for all values of j and k. This is important considering the fourth window (i=4) is used as a "compensation" window to monitor the shape of the spectrum and thereby adjust the stripping constants for varying borehole conditions. This means that regardless of the relative concentrations of the elements k within the formation, the effects of the borehole upon the stripping constant for each element will be reflected consistently in the fourth window. Mathematically, the effect can be seen as follows.

The count rate in window four, for any borehole condition, can be written as $$C_4 = L(\eta)G_{4,1,T}(E_T, \Delta E_{4,1})K_{4,1,T}C_{1,T} + L(\eta)G_{4,2,U}(E_U, \Delta E_{4,2})K_{4,2,U}C_{2,U} + L(\eta)G_{4,3,K}(E_K, \Delta E_{4,3})K_{4,3,K}C_{3,K} \tag{12}$$

where the $K_{4,j,k}$'s are stripping constants measured in the "standard" borehole conditions surrounded by formations each of which contains only K, only U, or only Th.

But from FIG. 2, we have seen that windows have been selected such that $$L(\eta)G_{4,j,k}(E_k, \Delta E_{4,j}) \approx \text{Constant.} \tag{13}$$

for all values of j and element k for this particular non-standard borehole. Although $L(\eta)$ will vary with changing borehole conditions, $G_{4,j,k}(E_k, \Delta E_{4,j})$ will remain constant since it is a function only of $E_k$ and $\Delta E_{4,j}$ which, of course, are fixed. We can then write equation (13) for any borehole condition as $$L(\eta)G_{4,j,k}(E_k, \Delta E_{4,j}) = L(\eta)\overline{G} \tag{14}$$

where $\overline{G}$ is a constant. Substituting (14) into (12) yields $$C_4 = L(\eta)\overline{G}[K_{4,1,T}C_{1,T} + K_{4,2,U}C_{2,U} + K_{4,3,K}C_{3,K}] \tag{15}$$

FIG. 2-A shows additional ratios $K'_{i,j,T}/K_{i,j,T}$ obtained from experimental data and Monte Carlo calculations using tool, borehole, and formation parameters such that $L(\eta)\overline{G}$ varied from 0.87 to 7.06. These data indicate that, within the limits of statistical accuracy, the products $L(\eta)G_{i,j,k}(E_k, \Delta E_{i,j})$ can be represented by an equation of the form:

$$L(\eta)G_{i,j,k}(E_k, \Delta E_{i,j}) = 1 + F(E_k, \Delta E_{i,j})m(L(\eta)\overline{G} - 1)^\eta \tag{16}$$

where
$F(E_k, \Delta E_{i,j}) \equiv$ a function only of $E_k$ and $\Delta E_{i,j}$.
$m$ = a constant = $+1$ if $L(\eta)\overline{G} \geq 1.0$ and
= $-1$ if $L(\eta)\overline{G} \leq 1.0$ Fitting equation (16) to the data shown in FIG. 2-A gives $$\eta \approx 0.8$$

$$F(E_T, \Delta E_{2,1}) \approx 0.22$$

or $$L(\eta)G_{2,1,T}(E_T, \Delta E_{2,1}) = 1 + 0.22m(L(\eta)\overline{G} - 1)^{0.8}$$

and $$F(E_T, \Delta E_{3,1}) = 0.50 \tag{17}$$

or $$L(\eta)G_{3,1,T}(E_T, \Delta E_{2,1}) = 1.0 + 0.50m(L(\eta)\overline{G} - 1)^{0.8} \tag{18}$$

Likewise, using uranium as a source, it can be shown that $$F(E_U, \Delta E_{3,2}) = 0.08$$

or $$L(\eta)G_{3,2,U}(E_U, \Delta E_{3,2}) = 1.0 + 0.08m(L(\eta)\overline{G} - 1)^{0.8} \tag{19}$$

Substituting equation (17), (18), and (19) into equation (9), (10), and (11) yield $$C_{1,T} = C_1 \tag{20}$$

$$C_{2,U} = C_2 - (1 + 0.22m(L(\eta)\overline{G} - 1)^{0.8})K_{2,1,T}C_1 \tag{21}$$

$$C_{3,K} = C_3 - [(1+0.50m(L(\eta)\overline{G}-1)^{0.8})K_{3,1,T}C_1] - [(1+0.08m(L(\eta)G-1)^{0.8})K_{3,2,U}(C_2-(1+0.50m(L(\eta)\overline{G}-1)^{0.8})K_{2,1,T}C_1)] \quad (22)$$

These equations, along with equation (15), now give us four equations and four unknowns ($C_{1,T}$; $C_{2,U}$; $C_{3,K}$; and $[L(\eta)\overline{G}]$) since $C_1$; $C_2$; $C_3$; and $C_4$ are measured and the $K_{i,j,k}$'s are known calibration constants.

For borehole conditions normally encountered, $0.5 < L(\eta)\overline{G} < 1.5$. For this range of $L(\eta)\overline{G}$, the expressions for $L(\eta)G_{i,j,k}(E_k, \Delta E_{i,j})$ can be approximated, with good accuracy, as ps $$L(\eta)G_{2,1,T}(E_T,\Delta E_{2,1}) \doteq 1+0.27(L(\eta)\overline{G}-1) \quad (17\text{-}a)$$

$$L(\eta)G_{3,1,T}(E_T,\Delta E_{3,1}) \doteq 1+0.57(L(\eta)\overline{G}-1) \quad (18\text{-}a)$$

$$L(\eta)G_{3,2,U}(E_U,\Delta E_{3,2}) \doteq 1+0.08(L(\eta)\overline{G}-1) \quad (19\text{-}a)$$

yielding $$C_{1,T} \doteq C_1 \quad (20\text{-}a)$$

$$C_{2,U} \doteq C_2 - (1+0.27(L(\eta)\overline{G}-1))K_{2,1,T}C_1 \quad (21\text{-}a)$$

$$C_{3,K} \doteq C_3 - [(1+0.57(L(\eta)\overline{G}-1))K_{3,1,T}C_1] - [(1+0.08(L(\eta)\overline{G}-1))K_{3,2,U}(C_2-(1+0.27(L(\eta)\overline{G}-1))K_{2,1,T}C_1)] \quad (22\text{-}a)$$

Note that in standard borehole conditions, $L(\eta)G_{i,j,k}=1$, and this is reflected in equation (16).

Figure 3:
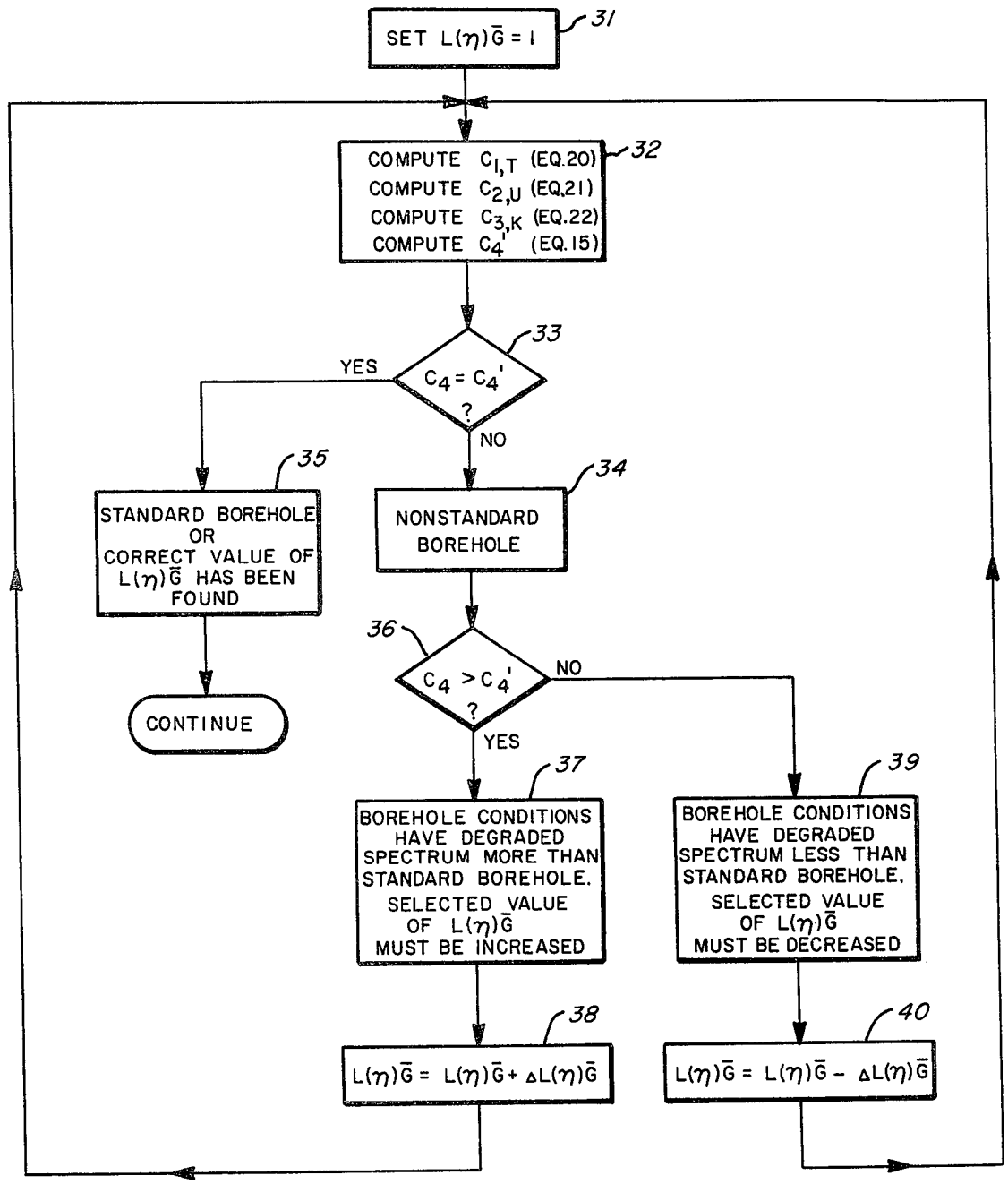
FIG. 3 is a flow chart illustrating a computer implemented method of determining a borehole compensation parameter.

The solution of the four simultaneous equations is time consuming. There is, however, an iteration technique which could also be used to obtained approximate real time solutions in logging operations. A flow chart or logic flow of the solution is shown in FIG. 3.

Upon entry into the iteration technique scheme at logic block 31 the function $L(\eta)\overline{G}$ is set initially equal to 1.0 as a first guess (i.e. standard borehole conditions). Control is then transferred to logic block 32 where computations of $C_{1,T}$; $C_{2,U}$ and $C_{3,K}$ are made using equations 20, 21, 22 respectively. Substituting these variables, together with the assumed $L(\eta)\overline{G}$, into equation 15, results in a calculation of the expected count rate $C_4'$ in window 4 ($C_4'$ replaces $C_4$ in the equation to denote a calculated rather than a measured value). Control is then transferred to logic block 33 where a comparison test is made to determine if the computed $C_4'$ is about equal to the observed window four count rate $C_4$. If $C_4$ and $C_4'$ are within some preselected value $\Delta C_4$ of each other, then the iteration scheme is complete and control is transferred to logic block 35 where the correct value of $L(\eta)\overline{G}$ is output. If the test at block 33 does not pass, then nonstandard borehole conditions are being encountered as indicated at logic block 34 and control is transferred to logic block 36 where a second test to determine if $C_4 > C_4'$. If $C_4 > C_4'$ then control is transferred to block 37 where (at block 38) the function $L(\eta)\overline{G}$ is increased. If $C_4 < C_4'$ then control is transferred to logic blocks 39 and 40 where the function $L(\eta)\overline{G}$ is decreased. Exit from either logic block 38 or 40 is to loop back to block 32 where another iteration is begun with the updated value of the function $L(\eta)\overline{G}$. In this manner the function $L(\eta)\overline{G}$ for the particular borehole conditions being encountered may be determined.

The rate at which the solution converges can be seen with the following example:

EXAMPLE = 5½" F.W. CSG, 10"B.H.+CMT

| | |
|---|---|
| $C_1 = 1.7$ | These observed count rates are in |
| $C_2 = 1.14$ | arbitrary units but the relative |
| $C_3 = 2.87$ | elemental proportions are typical of |
| $C_4 = 3.80$ | those observed in an average kaolinite (13 ppm, Th, 2 ppm U, 0.42% K) |

$\Delta L(\eta)\overline{G} = 0.10$  Standard B.H. = 10" F.W. Open for which
$K_{2,1,T} = 0.118$    $K_{4,1,T} = 0.357$
$K_{3,1,T} = 0.157$    $K_{4,2,U} = 0.647$
$K_{3,2,U} = 0.406$    $K_{4,3,K} = 0.657$

| $L(\eta)\overline{G}$ | $C_{1,T}$ | $C_{2,U}$ | $C_{3,K}$ | $C_4'$ | $C_4$ |
|---|---|---|---|---|---|
| 1.00 | 1.7 | 0.939 | 2.222 | 2.674 | 3.80 |
| 1.10 | 1.7 | 0.934 | 2.197 | 2.921 | 3.80 |
| 1.20 | 1.7 | 0.928 | 2.171 | 3.160 | 3.80 |
| 1.30 | 1.7 | 0.923 | 2.146 | 3.398 | 3.80 |
| 1.40 | 1.7 | 0.918 | 2.122 | 3.633 | 3.80 |
| 1.50 | 1.7 | 0.912 | 2.096 | 3.832 | 3.80 |

Therefore $L(\eta)\overline{G} = 1.47$

In many applications, iteration on each subsequent data set could begin in block 31 assuming as an initial value the $L(\eta)\overline{G}$ obtained as a result of convergence on prior data set(s). In intervals of constant or slowly changing borehole conditions, this will result in more rapid convergence than if standard conditions were initially assumed.

CONVERSION OF $C_{1,T}$ and $C_{2,U}$ and $C_{3,K}$ TO ELEMENTAL CONCENTRATIONS The stripped count rates $C_{i,k}$ are converted to the corresponding elemental concentrations $M_k$ using the relationship $$M_k = C_{i,k}/B(\eta)Q_k \quad (23)$$

where $Q_k$ (k=T,U,K)=calibration constants measured with the tool in a *standard borehole* surrounded by one of three formations containing known concentrations of Th, of U, or of K.

$B(\eta)$=a term which normalizes the calibration constants $Q_k$, which were measured using standard borehole conditions, to borehole which are non-standard.

Monte Carlo calculations have shown that, to a good approximation, $\eta$ can be computed from $L(\eta)G$ (which is obtained in the previously described iteration process) using the equation $$\eta = (L(\eta)\overline{G} - 0.093)/0.0324 \quad (24)$$

Note that the standard borehole $L(\eta)\overline{G}=1$ and $\eta=28$. Also, Monte Carlo calculations show that the function form of $B(\eta)$ can be approximated by:

$$B(\eta) = 6.91 \exp(-0.01m + 0.001\eta^2) \quad (25)$$

To summarize, $M_k$ is computed from the corresponding stripped count rate $C_{i,k}$ as follows (a) $L(\eta)\overline{G}$ is obtained from the previously described iteration technique or direct solution of the set of 4 equations.

(b) $\eta$ is computed from equation (24) using $L(\eta)\overline{G}$ (c) $B(\eta)$ is computed from equation (25) using $\eta$ (d) $M_k$ is computed from equation (23) using $B(\eta)$ and the appropriate stripped count rate $C_{i,k}$ The improvement in accuracy of the resulting $M_k$ values in nonstandard boreholes can be demonstrated by using again hypothetical Monte Carlo data computed in a standard and nonstandard borehole.

For a (nonstandard) 10" borehole containing a 5½" fresh water filed casing and a cement annulus, the borehole compensated stripped count rates are $$C_{1,T}=1.7; \quad C_{2,U}=0.92; \quad C_{3,K}=2.11 \tag{26}$$

with an iterated value of $L(\eta)G=1.47$. Using equation (24)

$$\eta=42.5 \tag{27}$$

Using equation (25) and the result of (27) yields $$B(\eta)=0.599 \tag{28}$$

For the purposes of this hypothetical demonstration, assume $$Q_k=1 \text{ for } K=T, U, \text{ and } K \tag{29}$$

Substituting the values from equations (29), (28) and (26) into equation (23) yields $$M_T=2.83; \quad M_U=1.54; \quad M_K=3.52 \tag{30}$$

Monte Carlo calculations using the standard borehole geometry with identical elemental concentrations yielded $$M_T=2.80; \quad M_U=1.52; \quad M_K=3.65 \tag{31}$$

indicating good agreement.

APPLICATION OF BOREHOLE COMPENSATION TECHNIQUE TO GAMMA RAY SPECTRA ANALYZED BY THE METHOD OF LEAST SQUARES FITTING

Assuming standard borehole conditions, $N_i$, the total number of gamma ray counts in energy channel i, whose midpoint represents gamma radiation of energy $E_i$, is given by $$N_i=\Sigma_k W_k N_{i,k} \tag{32}$$

where $N_{i,k}$=number of gamma ray counts in energy channel i from the spectrum of element k, measured in standard borehole conditions (the "library" spectrum)

$W_k$=a term proportional to the concentration of element k within the formation The terms of interest $W_k$, which are related to the elemental concentrations, are determined using the least square criterion $$\Sigma i (\overline{N}_i - N_i)^2 = MINIMUM \ VALUE \tag{33}$$

where $\overline{N}_i$=the number of gamma ray counts *observed* in energy channel i.

When non-standard borehole conditions are encountered, the standard or "library" spectra counts $N_{i,k}$ must be modified by $$N'_{i,k}=L(\eta)G(E_i)N_{i,k} \tag{32}$$

where $N'_{i,k}$=the library spectra counts in channel i from element k for non-standard borehole conditions $G(E_i)$=a term which is a function of the gamma ray energy $E_i$ recorded in the mid-point of energy channel i.

Again, using the least-squares criterion $$\Sigma i(\overline{N}_i - N_i')^2 = MINIMUM \ VALUE \tag{35}$$

where $$N_i' = \Sigma_k W_k N'_{i,k} \tag{36}$$

The terms $G(E_i)$ can be computed or measured. Therefore, the set of equations generated by the least squares criterion can be solved for $W_k$ and $L(\eta)$.

Elemental concentrations, $M_k$, are then computed from $$M_k = W_k/B(\eta)Q_k' \tag{37}$$

where $Q_k'$=calibration constants measured with the tool in a *standard borehole* surrounded by one of three formations containing known concentrations of Th, of U, or of K.

and $B(\eta)$ and $\eta$ are given by equations (25) and (24), respectively.

OTHER INFORMATION CONTAINED IN $\eta$ OR FUNCTIONS OF $\eta$

Since $\eta$ is predominately a function of borehole parameters (as are $L(\eta)\overline{G}$ and $B(\eta)$), it is possible to monitor overall borehole conditions using an output curve of $\eta$, $L(\eta)G$, $B(\eta)$, or some other function, $H(\eta)$. If all but one borehole parameter were known to be constant, then changes in $\eta$ (or a function of $\eta$) would imply changes in the remaining variable. For example, if the borehole fluid and casing in a cemented well were unchanging, then changes in $\eta$ will be related primarily to changes in cement thickness (ignoring the small additional perturbations caused by formation density changes). With a properly calibrated instrument it should be possible to quantify the changing borehole variable. In the event that all borehole variables are constant, then statistically significant $\eta$ changes will provide a direct measurement of formation density.

Referring now to FIG. 4, a well logging system in accordance with the concepts of the present invention is illustrated schematically. A well borehole 41 penetrates earth formations 46 and is lined with a steel casing. It will be understood that the invention can also be used in open hole. The borehole 41 contains a wellbore fluid 42 to control pressure in subsurface formations. Suspended in the borehole 41 by an armored well logging cable 56 of the conventional type, is a downhole measurement probe or sonde 43 containing instrumentation for measuring gamma ray spectral characteristics of the earth formations 46 penetrated by the borehole 41. Signals from the downhole sonde 43 are conducted to the surface on conductors of the cable 56 and supplied to a surface computer 54 which performs the hereinbefore described signal processing techniques in order to extract the elemental constituents of potassium, uranium and thorium present in the earth formations 46 which are then recorded as a function of borehole depth on the recorder 55. The well logging cable 56 passes over a sheave wheel 44 which is electrically or mechanically coupled (as indicated by a dotted line 45) to the computer 54 and recorder 55 in order to provide depth information about the downhole sonde 43 for the surface recording process. The surface computer 54 may be a model PDP-11 provided by Digital Equipment Corp. of Cambridge, Mass. and can be programmed in a high level language such as FORTRAN to perform the previously described computations and to drive the output displays.

The downhole sonde 43 contains near the lower end thereof a gamma ray detecting system comprising a scintillation crystal 47 and a photomultiplier and amplifier package 48. Power for the operation of the downhole sonde system is supplied from a surface power supply 53 via conductors of the cable 56 to a downhole power supply 51 where it is converted to appropriate voltage levels and supplied to the downhole circuitry components of the system as indicated in FIG. 4. Gamma ray spectral signals are supplied from the photomultiplier tube 48 to a pulse height analyzer 49 where they are separated into count rates in the four energy windows hereinbefore described. The pulse height analyzer provides the four output signals corresponding to the count rates in each of the energy windows herein described to a telemetry system 50 where the pulse height gamma ray spectral information is converted to an appropriate wave form for transmission to the surface via conductors of the well logging cable 56. Downhole control circuits 51 provide timing pulses to the pulse height analyzer and telemetry system in order to synchronize the transmission at regular data intervals from the downhole sonde 43 to the surface equipment. These synchronization signals are also encoded in the telemetry system 50 and supplied to the surface computer 54.

Thus, naturally occurring gamma rays from the earth-formations 46 are detected by the scintillation crystal 47 photomultiplier 48 detector system in the downhole sonde 43, broken down into their energy constituents by the pulse height analyzer 49 and telemetered to the surface by the telemetry system 50 on conductors of the armored well logging cable 56. At the surface, the signals are processed in accordance with the hereinbefore described techniques in order to extract the radioactive elemental constituency of earth formations 46 penetrated by the borehole 41.

The foregoing description may make other alternative arrangements according to the concepts of the present invention apparent to those skilled in the art. The aim of the appended claims therefore is to cover all such changes and modifications as are truly within the scope of the invention.

We claim:

1. A method of natural gamma ray spectral logging of a well borehole to determine the relative elemental constituency of uranium, potassium and thorium in earth formations penetrated by a well borehole, substantially independently of borehole conditions, comprising the steps of:

obtaining, with a borehole measurement system standard individual gamma ray spectra of uranium, potassium and thorium bearing earth formations penetrated by well boreholes having standard geometrical and constituent properties;

obtaining, with a borehole measurement system, an unknown gamma ray energy spectrum in a measurement borehole having unknown borehole conditions, said unknown gamma ray spectrum being divided into gamma ray intensities measured in at least four energy bands corresponding to a first energy band containing the 2.61 MeV thorium decay peak, a second energy band containing the 1.76 MeV uranium decay peak, a third energy band containing the 1.46 MeV potassium decay peak, and one or more additional energy bands for monitoring the shape of said unknown gamma ray spectrum as a function of borehole conditions;

comparing said standard individual gamma ray spectra with said unknown gamma ray spectrum to derive by an iterative process a parameter indicative of the effect of the unknown borehole conditions on the unknown gamma ray spectrum;

compensating said standard gamma ray spectra as a function of said parameter indicative of said unknown borehole conditions to derive a set of compensated standard gamma ray spectra; and, comparing said compensated standard gamma ray spectra with said unknown gamma ray spectrum to derive borehole compensated relative constituencies of uranium, potassium, and thorium in said unknown borehole.

2. The method of claim 1 wherein said additional energy band for monitoring the shape of said unknown gamma ray spectrum is taken in an energy region less than said first, second and third energy bands.

3. The method of claim 1 and further including repeating the steps of claim 1 at different relative depths in said unknown borehole and recording said relative constituencies of uranium, potassium and thorium as a function of borehole depth.

4. The method of claim 1 wherein the step of comparing said standard individual gamma ray spectra with said unknown gamma ray spectrum to derive by an iterative process a parameter indicative of the effect of the unknown borehole conditions on the unknown gamma ray spectrum includes the steps of deriving a first function, $L(\eta)G$, which is a measure of the deviation of counting rates in said energy bands caused by borehole conditions in said unknown borehole being different from the borehole conditions in said standard individual spectra boreholes.

5. The method of claim 4 and further including the step of using said compensated standard spectra to derive borehole compensated relative abundancies of uranium, potassium and thorium gamma rays in said unknown boreholes.

6. The method of claim 4 and further including the step of deriving from the function $L(\eta)G$ an estimate of $\eta$, a parameter indicative of density and thickness of borehole materials between the source of natural gamma rays in the formation and the measurement device used in the unknown borehole.

7. The method of claim 6 and further including the step of plotting the parameter $\eta$ as a function of borehole depth to indicate the thickness of material between the sources of natural gamma rays and the measurement device used in the borehole.

8. The method of claim 6 and further including the step of plotting a function of the parameter $\eta$ as an indicator of formation density as a function of borehole depth.

9. The method of claim 6 and further including the step of deriving a parameter $B(\eta)$ for normalizing concentration calibration constants measured for the standard individual element spectra to the nonstandard conditions of the unknown borehole.

10. The method of claim 9 and further including the step of computing the individual elemental concentrations of uranium, potassium and thorium in the unknown borehole from the unknown borehole spectrum as a function of the parameter $B(\eta)$.

11. The method of claim 1 wherein the comparison steps are performed by the technique of spectrum stripping.

12. The method of claim 1 wherein the comparison steps are performed by the technique of least square fitting.

13. The method of claim 1 wherein the steps of obtaining said standard spectra and said unknown spectrum are performed over an energy range of from approximately 0 MeV to approximately 3.0 MeV.

14. A method of natural gamma ray spectral logging of a well borehole to determine the relative elemental abundancies of uranium, potassium and thorium gamma rays in earth formations by comparison with standard gamma ray calibration spectra of uranium, potassium and thorium taken in standard boreholes having standard geometrical and constituent properties, comprising the steps of:

obtaining with a borehole measurement system an unknown gamma ray energy spectrum in a measurement borehole having unknown borehole conditions, said unknown gamma ray spectrum comprising gamma ray intensities measured in at least four energy bands corresponding to a first energy band containing the 2.61 MeV thorium decay peak, a second energy band containing the 1.76 MeV uranium decay peak, a third energy band containing the 1.46 MeV potassium decay peak and one or more additional energy bands for monitoring the shape of said unknown gamma ray spectrum as a function of borehole conditions;

comparing said standard gamma ray spectra with said unknown gamma ray spectrum to derive by an iterative process a parameter indicative of the effect of the unknown borehole conditions on the unknown gamma ray spectrum; and deriving as a function of said indicative parameter borehole compensated relative abundancies of uranium, potassium and thorium gamma rays in said unknown borehole.

15. The method of claim 14 wherein the steps are repeated at different borehole depths and the relative abundancies of uranium, potassium and thorium gamma rays are recorded as a function of borehole depth.

16. The method of claim 14 wherein said deriving step further includes the step of compensating said standard spectra as a function of said indicative parameter to derive a set of borehole compensated standard gamma ray energy spectra.

17. The method of claim 16 wherein the step of compensating further includes the step of deriving by an iterative process a function $L(\eta)G$ which is a measure of the deviation of counting rates in said at least four energy bands caused by borehole conditions in said unknown borehole being different from the borehole conditions in said standard spectra boreholes.

18. The method of claim 17 and further including the step of using said compensated standard spectra to derive borehole compensated relative abundancies of uranium, potassium, and thorium gamma rays in said unknown borehole.

19. The method of claim 17 and further including the step of deriving from said function $L(\eta)G$, an estimate of $\eta$, a parameter indicative of density and thickness of borehole material between the source of natural gamma rays in the earth formations and the measurement device used in the unknown borehole.

20. The method of claim 19 wherein the steps are repeated at different borehole depths and the parameter $\eta$ is recorded as an indication of formation density as a function of borehole depth.

21. The method of claim 19 wherein a function of the parameter $\eta$ is recorded as an indication of said material thickness as a function of borehole depth.

22. The method of claim 14 wherein said comparison steps are performed by the technique of spectrum stripping.

23. The method of claim 14 wherein the comparison steps are performed by the technique of least squares fitting.

24. The method of claim 14 wherein said spectra are obtained over an energy range of from approximately 0 MeV to approximately 3.0 MeV.

25. A method of natural gamma ray spectral logging of a well borehole substantially independently of borehole conditions, comprising the steps of:

obtaining, with a borehole measurement system standard individual gamma ray spectra of uranium, potassium and thorium bearing earth formations penetrated by well boreholes having standard geometrical and constituent properties;

obtaining, with said borehole measurement system, an unknown gamma ray energy spectrum in a measurement borehole having unknown borehole conditions, said unknown gamma ray spectrum being divided into gamma ray intensities measured in at least four energy bands corresponding to a first energy band containing the 2.61 MeV thorium decay peak, a second energy band containing the 1.76 MeV uranium decay peak, a third energy band containing the 1.46 MeV potassium decay peak, and additional energy band(s), for monitoring the shape of said unknown gamma ray spectrum as a function of borehole conditions;

using stripping constants or fitting parameters for the above described bands from said standard individual gamma ray spectra with said unknown gamma ray spectrum to derive by an iterative process a parameter indicative of the effect of the unknown borehole conditions on the unknown gamma ray spectrum; and using said indicative parameter to derive borehole corrections for a measurement parameter.

26. The method of claim 25 wherein said standard stripping constants or fitting parameters are modified as a function of said parameter indicative of said unknown borehole conditions to derive a set of borehole compensated stripping constants or fitting parameters; and, using said compensated stripping constants or fitting, parameters with said unknown gamma ray spectrum to derive borehole compensated relative constituencies of uranium, potassium, and thorium gamma rays in said unknown borehole.

27. The method of claim 25 wherein said additional energy band(s) for monitoring the shape of said unknown gamma ray spectrum is taken in an energy region less than said first, second and third energy bands.

28. The method of claim 26 and further including repeating the steps of claim 26 at different relative depths in said unknown borehole and recording said relative constituencies of uranium, potassium and thorium gamma rays as a function of borehole depth.

29. The method of claim 25 wherein the step of deriving by an iterative process a parameter indicative of the effect of the unknown borehole conditions on the unknown gamma ray spectrum includes the steps of deriving a first function, $L(\eta)G$, which is a measure of the deviation of counting rates in said four or more energy bands caused by borehole conditions in said unknown borehole being different from the borehole conditions in said standard individual spectra boreholes.

30. The method of claim 29 and further including the step of deriving from the function $L(\eta)G$ an estimate of $\eta$, a parameter indicative of the density and thickness of borehole material between the source of natural gamma rays in the formation and the measurement device used in the unknown borehole.

31. The method of claim 25 and further including the step of deriving a parameter $B(\eta)$ for normalizing elemental concentration calibration constants measured for the standard individual element spectra to the non-standard conditions of the unknown borehole.

32. The method of claim 31 and further including the step of computing the individual elemental concentrations of uranium, potassium and thorium in the unknown borehole from the unknown borehole spectrum as a function of the parameter $B(\eta)$.

33. The method of claim 25 wherein the steps of obtaining said standard spectra and said unknown spectrum are performed over an energy range of from approximately 0 MeV to approximately 3.0 MeV.

34. The method of claim 26 and further including the steps of deriving a parameter $B(\eta)$ for normalizing elemental concentration calibration constants measured for the standard individual element spectra to the non-standard conditions of the unknown borehole.

35. The method of claim 34 and further including the step of computing the individual elemental concentrations of uranium, potassium and thorium in the unknown borehole from the unknown borehole spectrum as a function of the parameter $B(\eta)$.

* * * * *